United States Patent [19]

Maurer

[11] 4,344,358
[45] Aug. 17, 1982

[54] PROCESSING CHAMBER, IN PARTICULAR SMOKING CHAMBER

[76] Inventor: Siegfried Maurer, Forellenweg 1, 7752 Insel Reichenau, Fed. Rep. of Germany

[21] Appl. No.: 272,175

[22] Filed: Jun. 10, 1981

Related U.S. Application Data

[63] Continuation of Ser. No. 60,386, Jul. 25, 1979, abandoned.

[30] Foreign Application Priority Data

Aug. 3, 1978 [DE] Fed. Rep. of Germany ....... 2833949
Jan. 2, 1979 [DE] Fed. Rep. of Germany ....... 2900012
Apr. 20, 1979 [DE] Fed. Rep. of Germany ....... 2915960

[51] Int. Cl.³ ............................................... A23B 4/04
[52] U.S. Cl. ...................................... 99/476; 99/482; 126/198; 126/193; 312/31.1; 31/31.2
[58] Field of Search .......................... 99/467, 473–483, 99/516; 126/198, 193, 190; 312/31.1, 31.2, 31

[56] References Cited

U.S. PATENT DOCUMENTS

| | | | |
|---|---|---|---|
| 1,444,647 | 2/1923 | Trout et al. | 99/482 |
| 2,380,428 | 7/1945 | Gilliam | 99/476 |
| 2,576,925 | 12/1951 | Dillon | 99/476 |
| 2,640,414 | 6/1953 | Jensen | 99/476 |
| 2,790,380 | 4/1957 | Shryack | 99/476 |
| 3,069,998 | 12/1962 | Julian | 99/476 |
| 3,117,510 | 1/1964 | Irwin | 99/473 |
| 3,665,840 | 5/1972 | Horany | 99/479 |
| 3,747,513 | 7/1973 | Seelbach | 99/480 |
| 3,903,788 | 9/1975 | Freeland et al. | 99/475 |
| 3,971,308 | 7/1976 | Parker | 99/476 |

FOREIGN PATENT DOCUMENTS

| | | |
|---|---|---|
| 2312722 | 9/1973 | Fed. Rep. of Germany . |
| 2306182 | 8/1974 | Fed. Rep. of Germany ........ 99/476 |
| 2145094 | 10/1974 | Fed. Rep. of Germany . |
| 2438302 | 11/1977 | Fed. Rep. of Germany . |

Primary Examiner—Philip R. Coe
Assistant Examiner—Timothy F. Simone

[57] ABSTRACT

The present invention relates to a processing chamber which is suited for the processing of food, for example meat or meat products, by smoke or steam, comprising at least one unit for the generation of steam and/or smoke and/or for the cleaning of the chamber. The invention consists in that at least one of these units and/or a fan is arranged in the door (1) of the chamber or on the inside or outside of said door.

12 Claims, 13 Drawing Figures

PROCESSING CHAMBER, IN PARTICULAR SMOKING CHAMBER

This is a continuation application of Ser. No. 60,386, filed July 25, 1979, and now abandoned.

The present invention relates to a processing chamber which is suited for the processing of food by smoke or steam, comprising a built-in unit for the generation of steam and/or smoke and/or for the cleaning of the chamber, in particular with a continuously and automatically operating smoke generator.

The present invention relates in particular to installations, in which foods, in particular meat products or fish, can be cooked, simmered, dried or cooled, i.e. chambers in which all processing operations can be carried out to which the product is subjected. The invention may be implemented in connection with chambers wherein the processing medium is constantly circulated to an as large extent as possible within the chamber only and only quite insignificant immissions escape to the atmosphere or in older chambers which cause considerable immissions.

To avoid the disadvantages of separately arranged units, in particular smoke generators, with regard to the floor space, space requirements, connection lines or the like, it is known from DE-OS No. 26 10 746 (German laid open patent application) to accommodate the smoke generator in a drawer which is movably guided in the chamber. Although this has the advantage that an additional floor space for the smoke generator is not required and that the smoke generator is easily accessible and simple to operate by pulling out the drawer, but in the design of this known device it must be taken into consideration that the smoking trolleys must be run in at ground level into the chamber. In the known installation the smoke generator is therefore arranged in the middle of the chamber bottom and the lower edge of the chamber door is cut out so that the front side of the smoke generator is flush with the front face of the chamber door when the latter is closed. In the case of these known processing installations it is necessary that smoke trolleys are used which are designed so that they can be pushed over the smoke generator located at the chamber bottom, i.e. that the undercarriage has no cross members in the area in which the smoke generator is located when the smoking trolley is run in. At the same time this involves a limitation of the charging capacity. A further disadvantage over the known processing chamber consists in that the subsequent installation of a smoke generator into the chamber itself is very expensive and, as has been mentioned, requires appropriately designed smoking trolleys so that in many cases the expenditure of a subsequent installation of the smoke generator into the processing chamber equals the investment cost for a completely new processing chamber.

As a rule, steam generators are installed separately or in the side walls of the chambers, which, in the one case, results in long connection lines and condensate loss and, in the other case, in relatively thick side walls. In large installation with a plurality of adjacent chambers thick side walls are not desirable, in addition the units arranged in the side walls are not easily accessible for repairs.

Processing chambers, in particular those used for smoking, always require cleaning facilities in which hitherto a separate cleaning agent tank is connected with the installations via a pipe line system. This additional cleaning agent tank also requires floor space which in most cases is not available or very scarce, in particular in the case of the arrangement of a plurality of adjacent chambers and in particular in cases where the rear sides of these chambers are facing a wall. In addition, facilities of this type require long connection pipes. The accommodation of the cleaning agent tank in the side walls of the chambers would have the same disadvantages which have already been described with regard to the smoke and steam generators installed in the side walls.

It is the object of the present invention to avoid the aforementioned disadvantages.

According to the invention, this object is achieved in that at least one of the units containing a smoke or steam generator or a cleaning facility are arranged to swivel together with the chamber door. In this case, the unit may be installed in the door or mounted to the outside or inside of the door.

Advantages of the invention not only consist in that the bottom of the processing chamber is freely passable and the processing space fully usable and not partly covered by the units, in particular the smoke generator, but also in that the subsequent installation of the unit into the chamber door is relatively simple. In case of need, the door can be removed from the chamber for the purpose of subsequent installation of the unit and sent to the manufacturer where the fitting of a unit is much easier than in the sausage kitchen of a butcher's shop. Further advantages of the invention consist in the free accessibility of the unit from both sides when the door is open and in that the unit is arranged in a place of the chamber where it practically requires no additional space because the thickness of the doors is 50 to 100 mm anyhow. Should the thickness of the chamber door be insufficient for the accommodation of a unit, it can as well be increased a little because the space in front of the chamber door must always remain free for opening the chamber door and charging the interior space so that, even in the case of very cramped conditions, an increase of the chamber door thickness is not felt to be disadvantageous. Consequently, a smoke generator and/or a steam generator and/or a cleaning facility, i.e. one, two or all units may be accommodated in the chamber door. These units may be accessible from outside and/or inside, for example through an additional door which is either swivel-mounted in the chamber door or to the jamb of the chamber door. For example, one unit may be accessible from inside, another unit from outside, which offers particular advantages.

In addition to the advantages already mentioned, the installation of a smoke generator into the chamber door offers the further advantage that the heat produced during the smouldering of the smoking material can be dissipated to the outside without expensive cooling facilities being necessary. In known installations in which the smoke generator was arranged inside the chamber, such cooling facilities were required, if in the case of cold smoking processes the processing temperature in the chamber had to be kept below 30° C. Thus, in the case of a smoke generator arranged according to the invention in the chamber door, a thermal insulation may be provided between the smoke generator and the chamber interior, whereas such a thermal insulation between the smoke generator and the external surface of the chamber door may be omitted.

In one embodiment of the invention, a pipe leading the smoke from the smoke generator to the chamber interior is attached to the external surface of the chamber door so that an as large portion of the pipe wall as possible comes into contact with the outer atmosphere and can thus give off heat.

The arrangement for cleaning the chamber may have a special tank for the cleaning agent which may be granular or liquid. However, in one embodiment of the invention the unit is designed so that, in the case of cleaning processes during which there is no smoking material in the storage container of the smoke generator anyhow, the cleaning agent can be filled into this storage container. This presupposes that the storage container and the door for its charging are properly sealed towards the outside. The water from a water connection ending in this container dissolves the cleaning agent in said container and flushes it to the remaining parts of the unit, fills the unit and then passes through the smoke discharge lines at zero pressure to the circulation fan which sucks in the cleaning agent together with the circulation air and disperses it in the processing space of the chamber. Once the cleaning agent is used up, the continued flow of water flushes the entire chamber sections. Thus, the residual smoke is removed and flushed out from the smoke generator, smoke lines and processing space in a very simple manner. An additional cleaning agent tank and special pressurized cleaning agent lines and distribution nozzles which are required in known cleaning facilities are therefore not necessary. The water supply can be controlled by hand or through a solenoid valve whereby it is ensured that the door of the processing space and consequently the smoke supply and discharge lines are tightly closed. As the storage tank has a capacity of appr. 30 to 40 liters, the water consumption is low. In order to avoid a water gush of 30 to 40 liters when opening the unit doors after completion of the cleaning operation, the unit doors are provided with a safety device which prevents inadvertent opening, but allows that the water content of 30 to 40 liters in the unit can downwardly flow out through a door gap.

The short smoke supply and discharge lines cannot only be simultaneously used as cleaning agent connection lines to the processing space, but also as steam supply lines to the processing space, if the steam generator of the unit is arranged in the chamber door or mounted to its external face. In this case, the steam connection lines with the unavoidable heat loss and condensate accumulation are not required.

In one embodiment of the invention means are provided for the automatic closing of the supply and discharge lines of the units when opening the doors or shutting down the installation. These means may be flaps or the like which are arranged in the supply and discharge lines, in particular in the vicinity of the line sections located in the chamber doors.

If, according to the invention, a smoke generator is installed in the chamber door, in a further development of the invention a device known as such for the humidification of the smouldering material may also be installed in the chamber door.

Should the smoking material storage container of the smoke generator at the same time be used as cleaning agent storage tank in the course of cleaning processes, an appropriate supply line ending above the cleaning agent tank is provided for the supply of the water required for the purification of the chamber.

Since a smoke generator installed in the chamber door must have very small dimensions, in particular a smoke generator is suited for such an installation in which the smoking material passes to the smouldering place without additional conveying means. For this reason the humidification of the smoking material preferably takes place in the vicinity of the smouldering place and moreover the smoking material is suitably used in the form of wood chips. However, it is also conceivable that fine-grained material, such as sawdust, is used.

Moreover, the present invention relates to one embodiment of a processing chamber, comprising a fan which circulates the processing medium (steam, air or smoke mixture). This embodiment of the invention is characterized in that the fan is either installed in the door or mounted to the door on the inside or outside. Admittedly, a processing chamber, comprising a smoke generator in which the fan is installed in the door, is already known from U.S. Pat. No. 3,069,998. However, this fan is not used for the circulation of the processing medium, but exclusively for drawing off vapors of smoke penetrating through the joint between the door and the door jamb and for recirculating them into the chamber interior, thus preventing the escape of these vapors of smoke into the work room.

Embodiments of the invention are represented in the following drawings.

Figure 1:
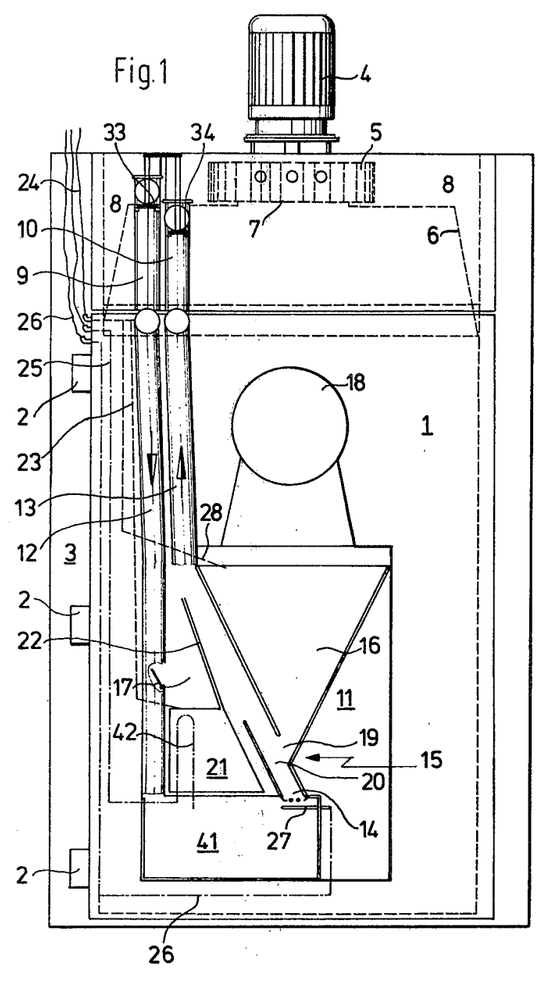
FIG. 1 shows a smoke generator installed in the chamber door, the front face being broken away.
Figure 2:
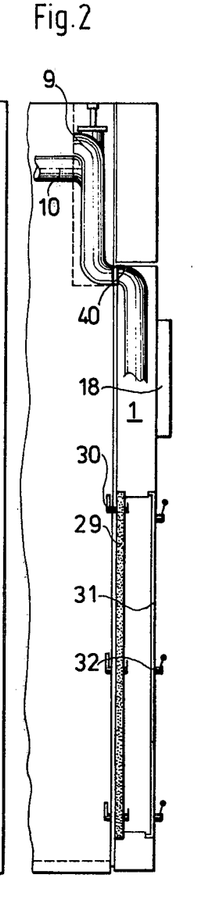
FIG. 2 shows a side view, partly sectioned, broken off.

In the embodiment of the invention represented in FIGS. 1 and 2, a chamber door 1 is swivel-mounted in the side wall 3 of the processing chamber by means of hinges. The top of the processing chamber carries a drive motor 4 which drives a fan wheel 5 arranged in the interior of the processing chamber. In the upper half of the processing chamber there is a generally bell-shaped baffle 6 which in the centre of the processing chamber has an opening 7 being in alignment with the lower central opening of the fan wheel 5 through which the fan wheel 5 draws in the processing medium from the interior of the processing chamber. From the periphery of the fan wheel 5 the processing medium is then forced into the distribution space 8 from where it passes through the interspace between the lower edge of the baffle 6 and the inner walls of the processing chamber to said processing chamber so that the processing medium is constantly circulated in the processing chamber. The interior space above the door has pipe sections 9 and 10 which are secured to the inside of the chamber front face, the upper end of pipe section 9 leading to the distribution space 8, but the upper end of pipe 10 leading directly to the chamber interior underneath the baffle in the vicinity of the opening 7.

In a hollow space 11 of the door 1 a smoke generator designated as a whole by the reference numeral 15 as well as an intake air duct 12 and an exhaust air duct 13 are accommodated. In the area of the upper edge the pipe sections 9 and 10 have an outwardly directed bend and, in the same area, the lines 12 and 13 have an inwardly directed bend so that, with the door being closed, the line sections 9 and 12 as well as the line sections 10 and 13 are pressed to one another by a seal 40 to form a vertical joint. Since the fan wheel 5 generates a pressure gradient between the distribution space 8 and the chamber interior, the line sections 9 and 12 are leading the processing medium to the smouldering place 14 of the smoke generator where the processing medium is enriched with smoke. The processing medium then leaves the smoke generator via the line sections 13 and 10 and enters the interior of the chamber. Since the upper pipe section 10 ends in the vicinity of the suction opening 7 of the fan wheel, there is always a maximum pressure difference between the line assembly 10, 13 and the line assembly 9, 12 and the smoke-enriched processing medium is already sucked in by the fan wheel 5 in the vicinity of its inlet into the chamber interior and uniformly forced to the interior of the chamber via the distribution space.

The draught at the smoldering place 14 can be regulated by means of a flap 17 which controls a by-pass between the intake line and the exhaust line. A funnel-shaped storage container 16 contains smoking material in the wood chips which can be filled into the storage container 16 through an opening closed by a cover 18. At the lower end of the storage container 16 the smoking material falls into a duct 19 at the lower end of which the smouldering place 14 is arranged, the upper end of said duct, however, upwardly extending some length beyond the outlet 20 of the storage container 16. Depending on its friction coefficient in the duct 19, the smoking material rises a little above the outlet 20, but does not attain the level of the smoking material in the storage container 16. As a result, on its path from the smouldering place 14 to the exhaust line 13, the smoke does not pass through the complete filling height of the storage container 16, but only through the small height of the smoking material contained in duct 19 and this height is almost completely independent of the height of the smoking material piled up in the storage container 16. In many cases the smoking material contained in the duct 19 only rises up to the upper edge of the cut-out 20.

During the entire processing the processing medium is circulated in the chamber and only such a quantity of fresh air is supplied as is absolutely necessary for the maintenance of the smouldering process. In general, the oxygen contained in the interior of the chamber as a result of the fresh air entrained by filling the chamber is sufficient for this purpose. Owing to this only a small quantity of smoke is required in the course of a smoking process and the smoke generator as well as the smouldering place may therefore be only of a small size so that they can be accommodated in the chamber door. As the smoke does not escape from the processing chamber during the smoking process, there are only very small immissions from the processing chamber either. Nevertheless, the storage container may be dimensioned so that it is capable of holding a supply of smoking material which is sufficient for the continuous operation of the smoke generator over a period of one or several day(s). It is satisfactory either if its capacity is sufficient to hold a quantity of smoking material which is necessary for the respective smoking process.

In the embodiment represented the door 1 is designed as salient box-type door, but it may also be designed as rabbet-joint door. Between the smoke generator and the inner wall of the door an insulating layer 29 is provided which is omitted between the smoke generator and the outer wall of the door, in particular in the zone of the smouldering place and, possibly, in the discharge zone either. The supply line to and the discharge line from the smoke generator are very short so that the pressure difference generated by the fan wheel 5 is sufficient to keep the smouldering place in operation, since in the course of smoking processes the fan wheel 5 must constantly be in operation to circulate the processing medium in the processing chamber.

In addition, above the ash pan 41 of the smoke generator 15 in the hollow space 11 there is a steam generator 2 which by means of electric heating rods generates heat if desired, said steam being passed to the exhaust duct 13, 10 via a line 22 and flowing to the processing space together with the smoke, if necessary. The water required for this purpose is supplied via a water supply line 23 which vertically upwardly discharges through a pipe bend above the upper door hinge 2 and which is connected to a water line connection point by means of a flexible hose coupling 24. The electric energy for the steam generator is supplied via a cable 25 which is also introduced into the door above the hinge 2 by means of a 90°-bend and routed to the electric heating resistors 42 in the steam generator 21 within the door. At the same time, an additional cable 26 above the hinge 2 is also introduced into the door through a 90°-bend and routed to the electric heating resistor 27 underneath the smouldering place 14 within the door. The heating resistor is used for the electrical ignition of the smoking material or, in another embodiment, for the overheating of the incoming air-smoke mixture to a temperature between 270° and 400° C. by means of which the smoking material through which the mixture flows is subjected to a dry distillation.

The electric energy and water supply can be controlled. The same applies to the steam supply to the lines 13, 10.

Via a water line 28 which is also introduced into the door above the hinge 2 and which ends above the smoking material storage container 16, water for cleaning processes is fed through the powdery or granular cleaning agent in the storage container 16, thus dissolving the latter. The purification solution subsequently flows through the smouldering place 14 into the entire hollow space 11 of the door which is filled up. The liquid and the foam formed thereby rise through the lines 13, 10 until the cleaning agent reaches the outlet of the line section 10 close to the suction opening 7 of the fan wheel 5 which rotates during cleaning processes and uniformly distributes the cleaning agent in the entire chamber volume. During the subsequent flushing either, the upwardly rising water is entrained by the rotating fan wheel 5 and distributed as flushing liquid in the processing space. In this simple manner the hollow space together with the smoke and steam generators, supply and discharge lines as well as the processing space in the chamber are purified without using further technical aids.

The inside of the door 1 (cf. FIG. 2) carries an insulated door flap 29 with a lock 30 through which the hollow space 11 is accessible. At the same time the outside of door 1 carries a non-insulated door flap 31 with a lock 32 through which the hollow space 11 is accessible from the outside. The door flaps 29 and 31 have seals (not represented in the drawings) which, upon closing by means of the locks 30 and 32, are pressed against the counter-cheeks of the door 1 so that they are absolutely smoke-, steam- and water-proof. The locks 30 and 32 are designed so that inadvertent, immediate opening of the door flaps 29 and/or 31 is not possible, but that they can be opened a crack only. As a result, after the completion of the cleaning operations, the flushing liquid in the form of clear water which is still present in the hollow space 11 and in the supply and discharge lines cannot escape in a gush upon inadvertent opening of the door flaps, but slowly flows out through the gap. Upon opening of the door 1, the flushing water emerging from this door gap as well as the flushing water from the processing space is collected and discharged by the drainage channels which are usually arranged in front of such installations. After the drainage of the flushing water which may still be present in the hollow space 11, the door flaps 29 and/or 31 can be fully opened. In the line sections 9 and 10 flaps 33 and 34 are arranged above which, in the course of smoking processes, are opened or closed continuously or at controlled intervals by solenoids or compressed-air cylinders. In the course of cleaning operations, these flaps are constantly opened. Means are provided which prevent inadvertent opening of the door 1 during cleaning processes. In addition, means are provided which automatically close the flaps 33 and 34 in the line sections 9 and 10 when the door 1 is being opened.

Figure 3:
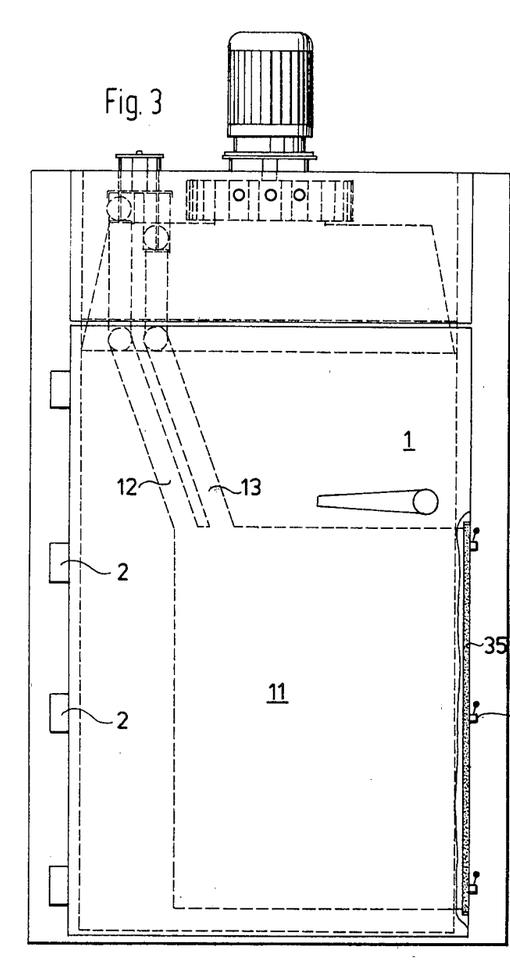
FIGS. 3 and 4 show another embodiment, with the door being arranged at one front face of the chamber door, in a representation corresponding to FIGS. 1 and 2, FIGS. 5 and 7 show front and FIGS. 6 and 8 side views of arrangement variants of supply and discharge lines.
Figure 4:
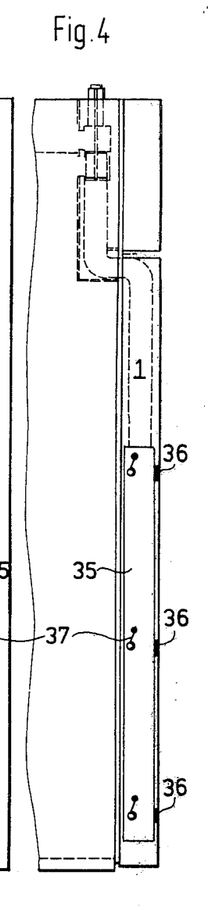

The embodiment of the invention represented in the FIGS. 3 and 4 differs from the embodiment represented in the FIGS. 1 and 2 in that the hollow space 11 in the chamber door 1 which is mounted to swivel about the hinges 2 is accessible from the front side of the door through an additional door 35. The door 35 is swivel-mounted in the door 1 by hinges 36 and can be locked airtight by means of locking toggles 37.

Figure 5:
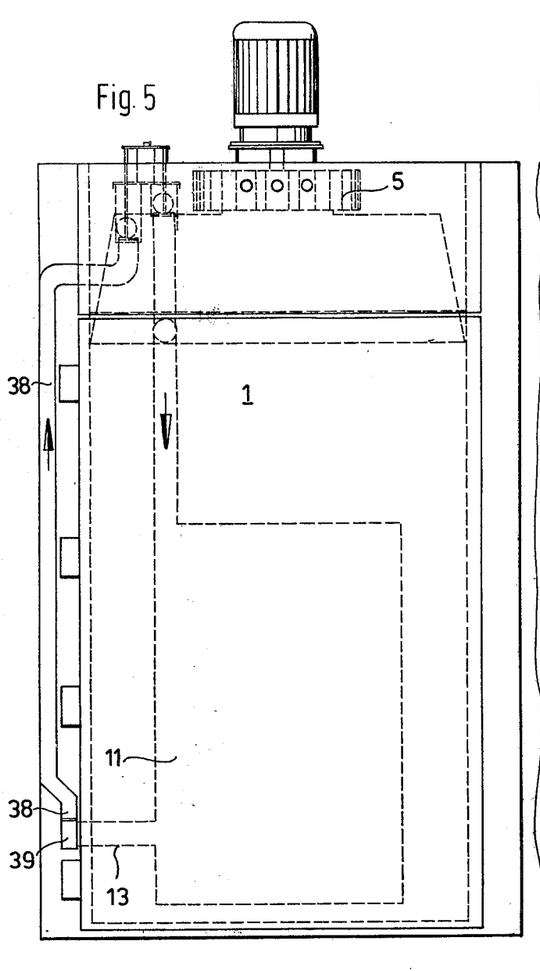

The embodiment of the invention represented in FIG. 5 differs from the embodiment according to FIGS. 1 and 2 mainly in that the line 38 leading from the smoke generator to the interior of the processing chamber is arranged outside of the chamber door 1 so that as much heat as possible can be dissipated to the atmosphere in the course of cold smoking processes. From the hollow space 11 the duct section 13 leads to a swivel joint 39 which is located in the swivelling axis of the chamber door 1; above the door 1 the line 38 then leads to the interior of the chamber where it ends underneath the baffle 6 in the vicinity of the suction opening for the fan impeller 5.

Figure 6:
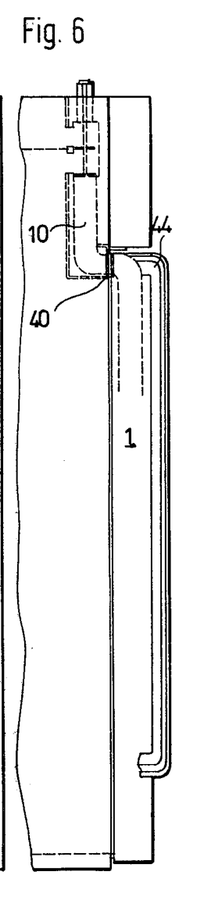

The embodiment according to FIG. 6 differs from the embodiment according to FIG. 5 in that the line 44 conveying the smoke from the smoke generator 5 to the interior of the processing chamber is routed upwardly on the outside of the leaf of door 1 to improve the heat removal, that it is inwardly bent at the upper edge of door 1 in the same manner as in the embodiment according to FIGS. 1 and 2 and that it forms an airtight connection with the line section 10 arranged in the upper portion of the chamber by means of a seal 40 when the door is closed.

Figure 7:
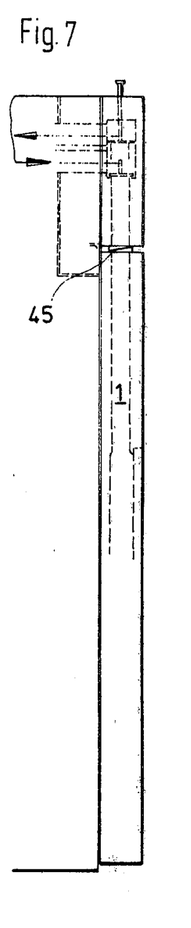

FIG. 7 shows a side view of an embodiment which differs from the embodiment according to FIGS. 1 and 2 in that said supply and discharge ducts are straight line sections without the bends represented in FIG. 1 being necessary, said straight line sections forming an airtight connection by means of an obliquely arranged press seal 45 after the door 1 has been closed.

Consequently, this embodiment has no bends at the interface between the ducts 9, 10 and 12, 13.

Figure 8:
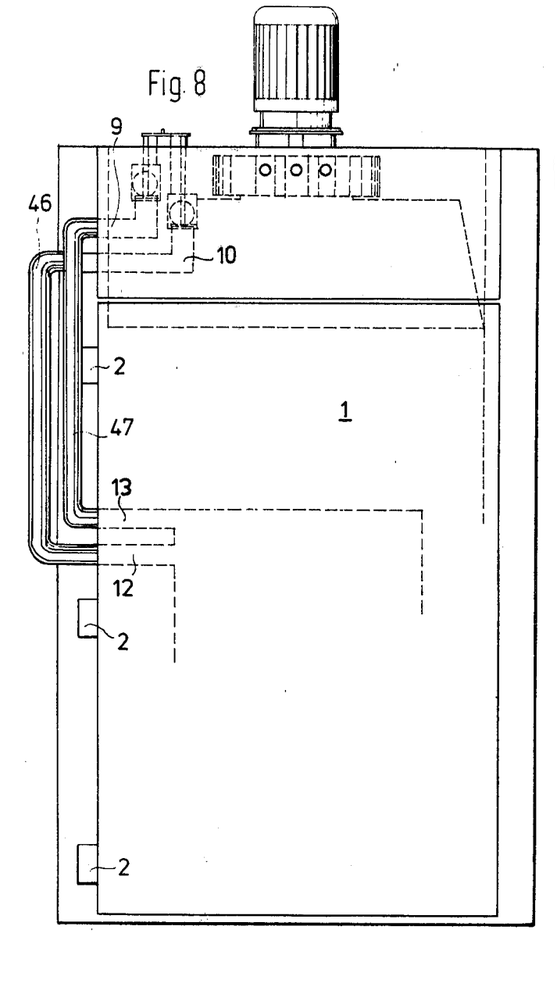

FIG. 8 shows an embodiment in which the supply line for the processing medium to the smoke generator and the line leading from the smoke generator to the interior of the processing chamber are established by movable hose connections. The line sections 12, 13 installed in the chamber door 1 emerge at the front face near the swivelling axis of the chamber door 1 where they end in the hose lines 46 and 47 which establish the connection to the line sections 9 and 10 arranged in the upper half of the chamber.

Figure 9:
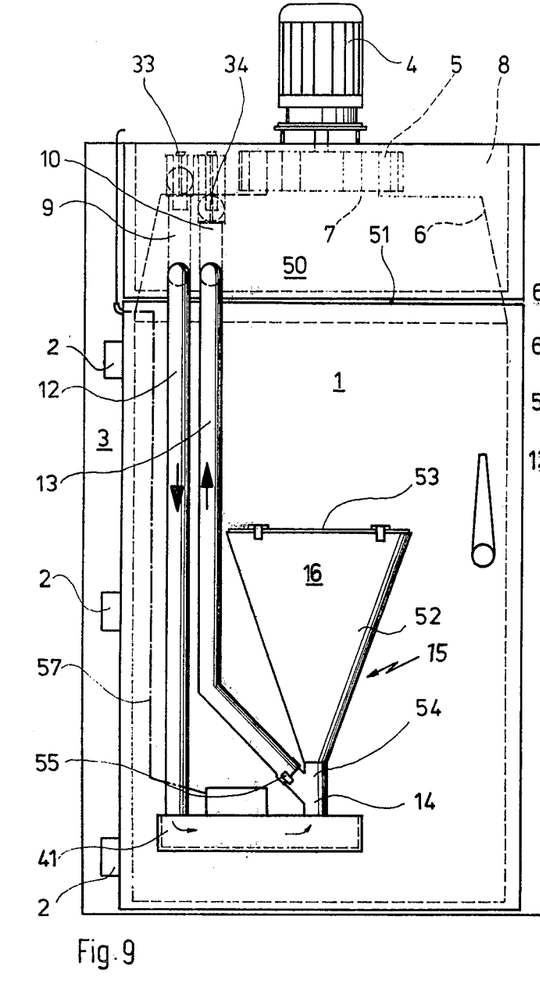
FIGS. 9 through 11 show another embodiment of the unit mounted to the outside of the door, in front, side and top views.
Figure 10:
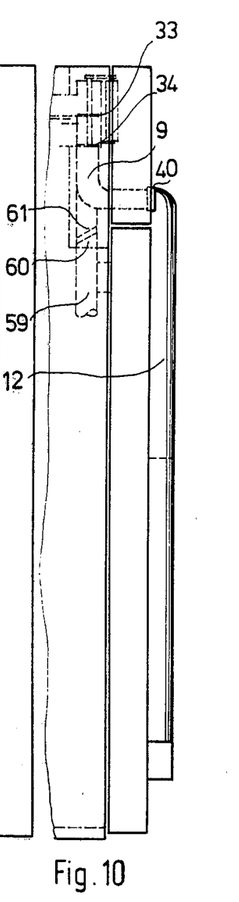
Figure 11:
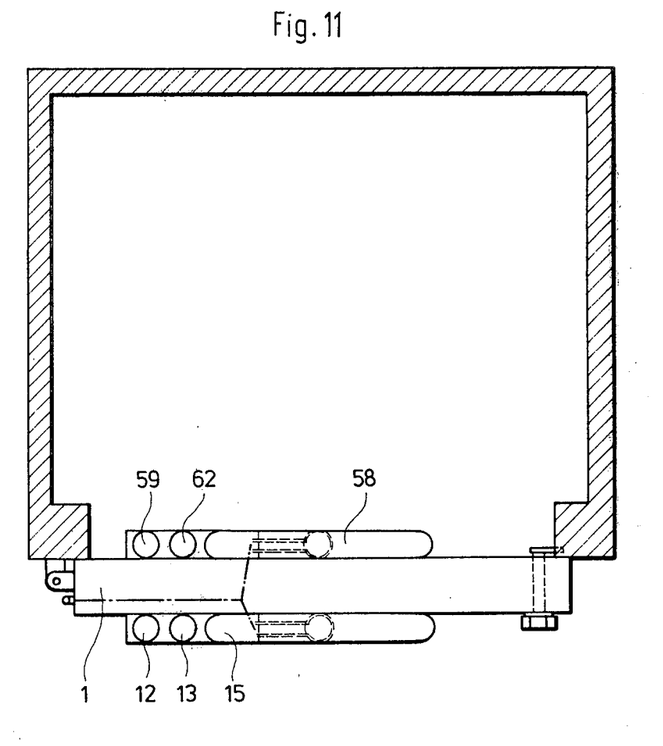

The embodiment represented in FIGS. 9 through 11 differs from the embodiment described above only in that the unit is not installed in the door itself, but mounted as a whole to the outside or inside of the door. According to FIG. 9, a smoke generator designated by the reference number 11 as well as a feed line 12 and a return line 13 are mounted to the outside of the door. The pipe sections 9 and 10 have outwardly directed bends and penetrate the upper section of the chamber front face a little above the upper edge of door 1. The lines 12 and 13 extend a small length upwardly beyond the joint 51 between the upper edge of chamber door 1 and the upper stationary section of the processing chamber front and they have inwardly directed bends at this upper edge which join the line sections 9 and 10 via seals 40.

In this embodiment the smoke generator 15 is provided with a lockable cover 53 for the container 52 which, via a sealing, is mounted on a base portion 54 in which the smouldering place is arranged. This base portion 54 is connected to the pipe 13 by means of a toggle-type fastener 55. An ash pan 41 is mounted to the portion 54 via a seal and removably secured to the air intake duct 12. A control box for the control of the temperature of the smouldering place 14 is connected with the control centre of the installation via a control line 57. At the upper ends of the line sections 9 and 10 locking means 33 and 34 are provided which are also connected to the control centre.

In FIG. 11 an embodiment of the invention is shown in a horizontal section wherein a smoke generator 15 is arranged on the outside of the door and a steam generator 58 on the inside of the door 1. The supply pipe 59 which delivers the processing medium to the steam generator 58 in this case opens in a branch pipe 61 of the pipe section 9 via a sealed oblique joint 60 and a closing flap (not represented in the drawing) is arranged in the branch pipe 61. In the same manner, the line 62 carrying away the processing medium from the steam generator 58 joins a branch pipe of the line section 10 at its upper end via an obliquely arranged sealed joint.

Figure 12:
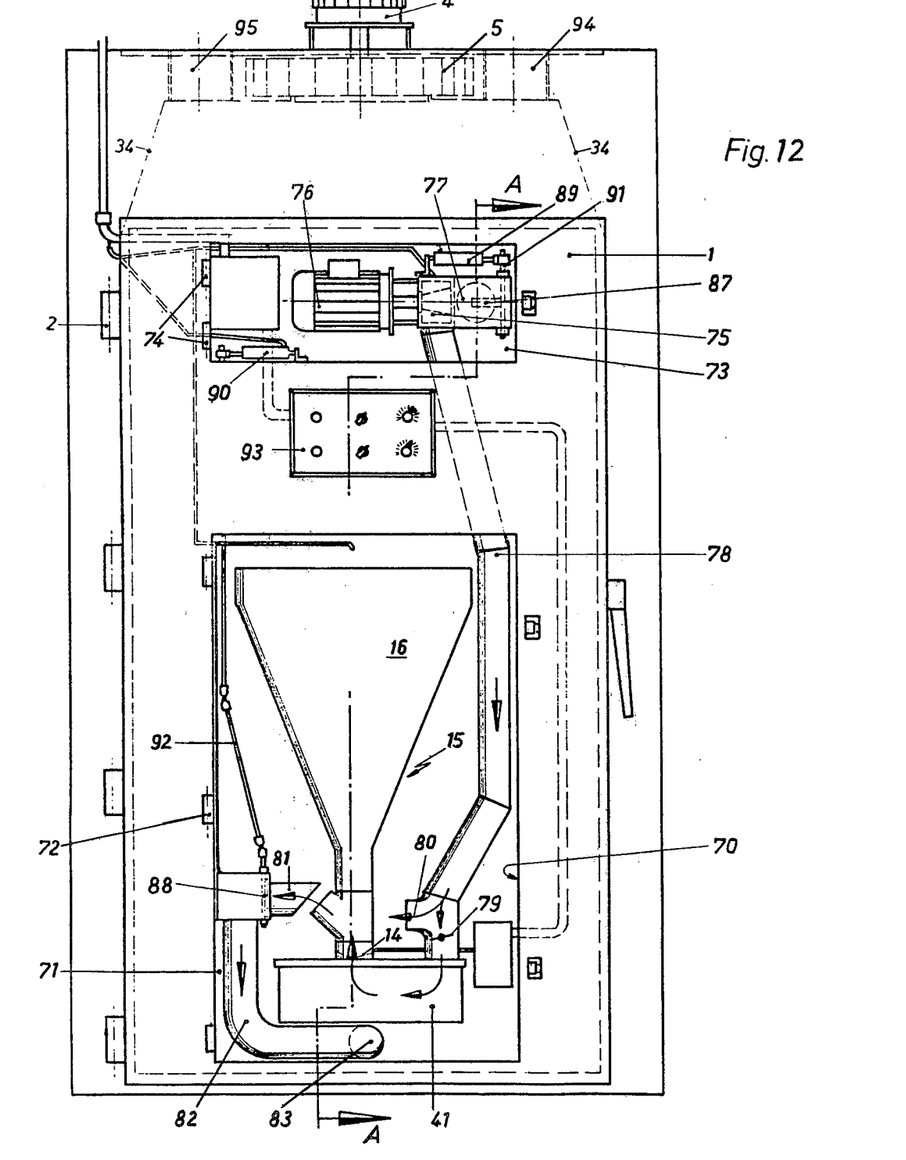
FIG. 12 shows a top view of a further embodiment, the front wall before the smoke generator being broken away.
Figure 13:
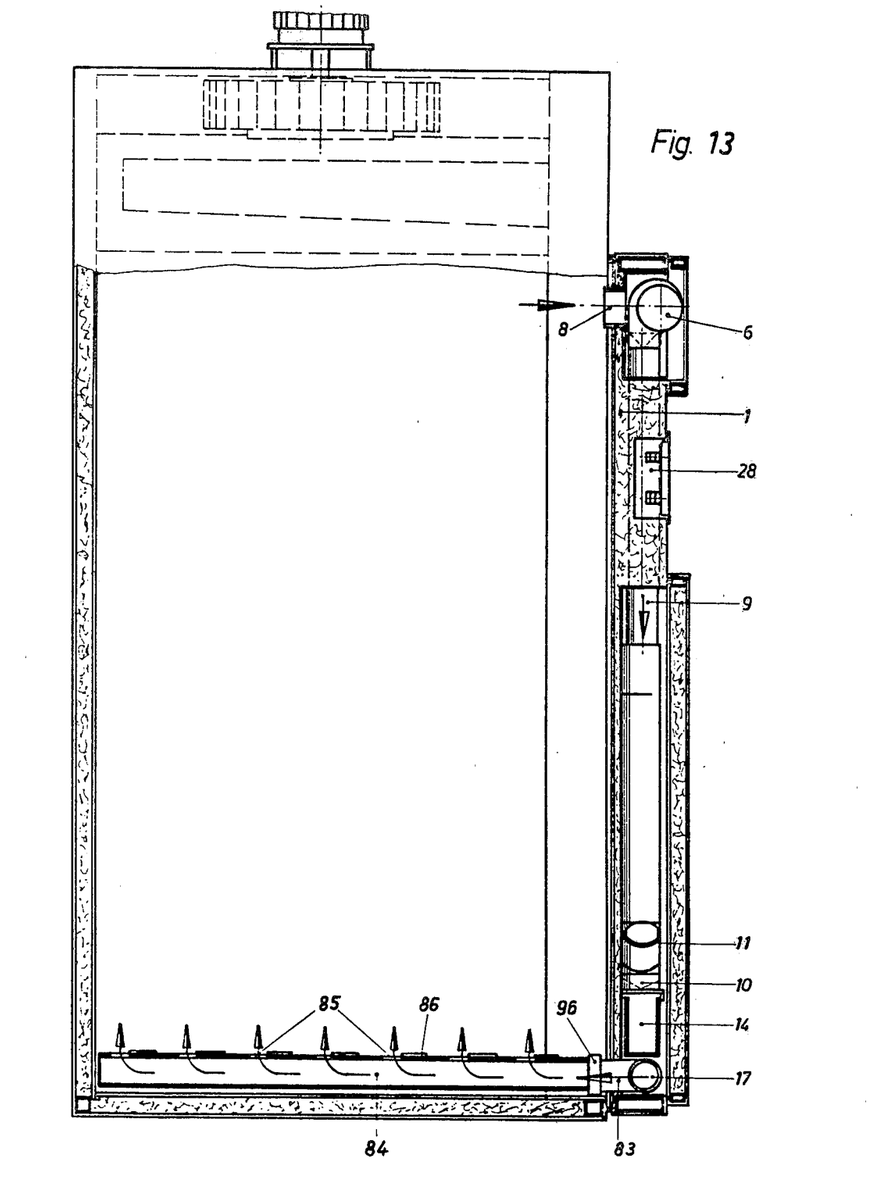
FIG. 13 shows a section taken along the line A—A in FIG. 12.

In the embodiment of the invention represented in FIGS. 12 and 13, the door 1 has a cut-out 70 in which a frame 71 is inserted which, in turn, is mounted in the door leaf 1 by means of hinges 72 to swivel about a vertical axis and which can be locked in the swivelled in door plane position. This frame 71 which can be closed by means of a covering or door (not represented in the drawing) towards the outside and towards the inside accommodates a smoke generator 15 or another of the aforementioned units. A further cut-out 73 in the door 1 which can be closed by a door (not represented in the drawing) which is supported by the hinges 74 accommodates a fan wheel 75 driven by an electric motor 76. The fan draws in the processing medium from the interior of the chamber through a suction opening 77 and feeds it via the line 78 to the smouldering place 14 of a smoke generator 15 the smoking material storage container of which is designated by the reference number 16. The partial flow supplied to the smouldering place 14 through an ash pan 41 can be restricted by means of a control flap 79. A partial flow 80 flows past the smoke generator 15 to the recirculation line 81 in which the partial flow is mixed with the smoke emerging from the smoke generator 15 and enters the processing space of the chamber via the pipe line section 82 and the outlet 83. In the embodiment of the invention represented in FIG. 13, the outlet 83 leads to a smoke distribution line 84 when the door 1 is closed or, alternatively, to an appropriately divided zone in the interior of the processing chamber which has smoke outlets 85 the size of which, in turn, can be adjusted by means of plates 86.

At the inlet 77 an adjustable flap 87 is arranged by which the inlet 77 can be completely closed either. An additional flap 88 regulates the admission of partial flows to the line 82. The flaps 87 and 88 are actuated by means of hydraulically or pneumatically operated cylinders 89 or 90 via appropriate rods 91 or 92, respectively. Electric servomotors for the actuation of the flaps 87 and 88 may also be provided. The cylinders 89 and 90 are connected to control means 93 which is also mounted in the cut-out 73. This control means 93 may also control an opening 94 for the fresh-air supply and-/or a discharge line 95 for the exhaust air.

The distribution pipe 84 as well as the plates with the outlets 85 and the closing plates 86 are not permanently connected with the bottom of the processing space and can be easily removed for maintenance. The connection between the pipe 84 and the opening 83 is established by means of an elastic sleeve 96 which seals this connection when the door 1 is closed.

In this embodiment of the invention, the fan 75, 76 is mainly used for moving the partial flow to the units which takes up smoke, steam or heat from these units or is cooled down.

However, it can also be used for the circulation of the total processing medium in the processing chamber. In this case, the fan 4, 5 arranged on the ceiling of the processing chamber is not required.

Having thus fully described my invention, what I claim as new and wish to secure by Letters Patent is:

1. Apparatus for the processing of food by means of at least smoke, comprising a housing; a partition within said housing separating the interior thereof into a distribution region and a food processing chamber; fluid circulating means mounted in said housing and having an inlet and outlet communicating with said distribution region and said food processing chamber; a door pivotably carried by said housing and sufficiently large for introduction and removal of food; means for generating smoke carried by said door for pivotal movement therewith; a first pair of conduit means carried by said housing and having one end extending therefrom outwardly of said housing, a second pair of conduit means carried by said door and having one end extending into said means for generating smoke, the other ends of said first and second pairs of conduit means being connectable on closing of said door to form two passages for the inlet of air to and the outlet of air from said smoke generating means; in said first pair of conduit means the conduit forming the air inlet passage having a section open adjacent the outlet of said fluid circulating means and the conduit forming the exhaust passage having a section open adjacent the inlet of said fluid circulating means, whereby the smoke is circulatable by said fluid circulating means from said smoke generating means through said food processing chamber and is recycled to said smoke generating means.

2. Apparatus according to claim 1, wherein said door is hollow and a removable flap is provided whereby said means for generating smoke is accessible from the outer side of the door.

3. Apparatus according to claim 1, wherein said door is hollow and a removable flap is provided whereby said means for generating smoke is accessible from the interior of the chamber.

4. Apparatus according to claim 1, wherein said means for generating smoke is arranged exteriorly of the door.

5. Apparatus according to claim 1, wherein said means for generating smoke is arranged on the inside of the door.

6. Apparatus according to claim 5, wherein steam generating means is arranged on the inner side of the door and is accessible from the outside thereof.

7. Apparatus according to claim 1, wherein the means for generating smoke is accessible through an additional opening which is located in said door.

8. Apparatus according to claim 1, wherein the interior of said door is thermally insulated.

9. Apparatus according to claim 1, wherein said means for generating smoke comprises a smoke generator, a portion of the smoke generator including a smouldering place, a container for the smoking material being provided and connected with said smouldering place, an ash pan and an exhaust air line, said smouldering place, said container, said ash can and said exhaust air line being connected by means of disconnectable coupling means.

10. Apparatus for the processing of food by means of at least smoke, comprising a housing having a food processing chamber therein; a door pivotably carried by said housing, said door being sufficiently large for introduction and removal of food; means for generating smoke carried by said door for pivotal movement therewith; fluid circulating means carried by said door for pivotal movement therewith; first conduit means carried by said door communicating said fluid circulating means with said chamber and with said smoke generating means and second conduit means communicating said smoke generating means with said chamber, third conduit means carried by said housing in the bottom region thereof and having one end extending therefrom outwardly of said housing, said end and one of said first and second conduit means carried by said door being connectable on closing said door, the third conduit means having smoke outlets distributed along the length of the third conduit means, whereby food processing medium is recirculated from said chamber, through said fluid circulating means and is returned to said chamber.

11. Apparatus according to claim 10, including additional fluid circulating means arranged on the ceiling of said processing chamber.

12. Apparatus according to claim 10, wherein said door is provided with a cut out portion and a frame is pivotably mounted within said cut out portion, said generating means being carried by said frame.

* * * * *